May 15, 1962

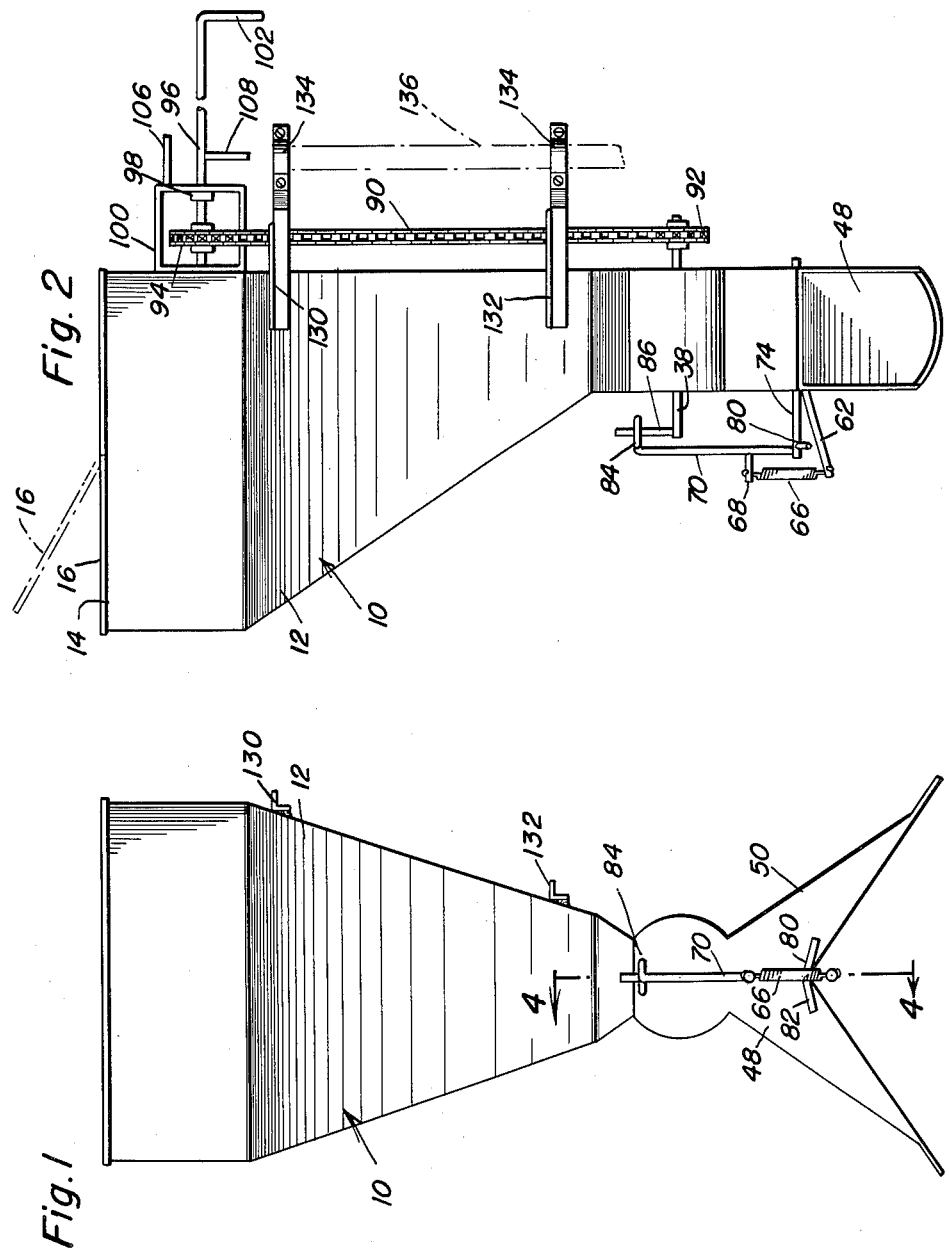

J. H. RUDD 3,034,688

DAIRY BARN FEEDER

Filed Aug. 6, 1959

Joseph H. Rudd
INVENTOR.

May 15, 1962  J. H. RUDD  3,034,688
DAIRY BARN FEEDER
Filed Aug. 6, 1959  3 Sheets-Sheet 3
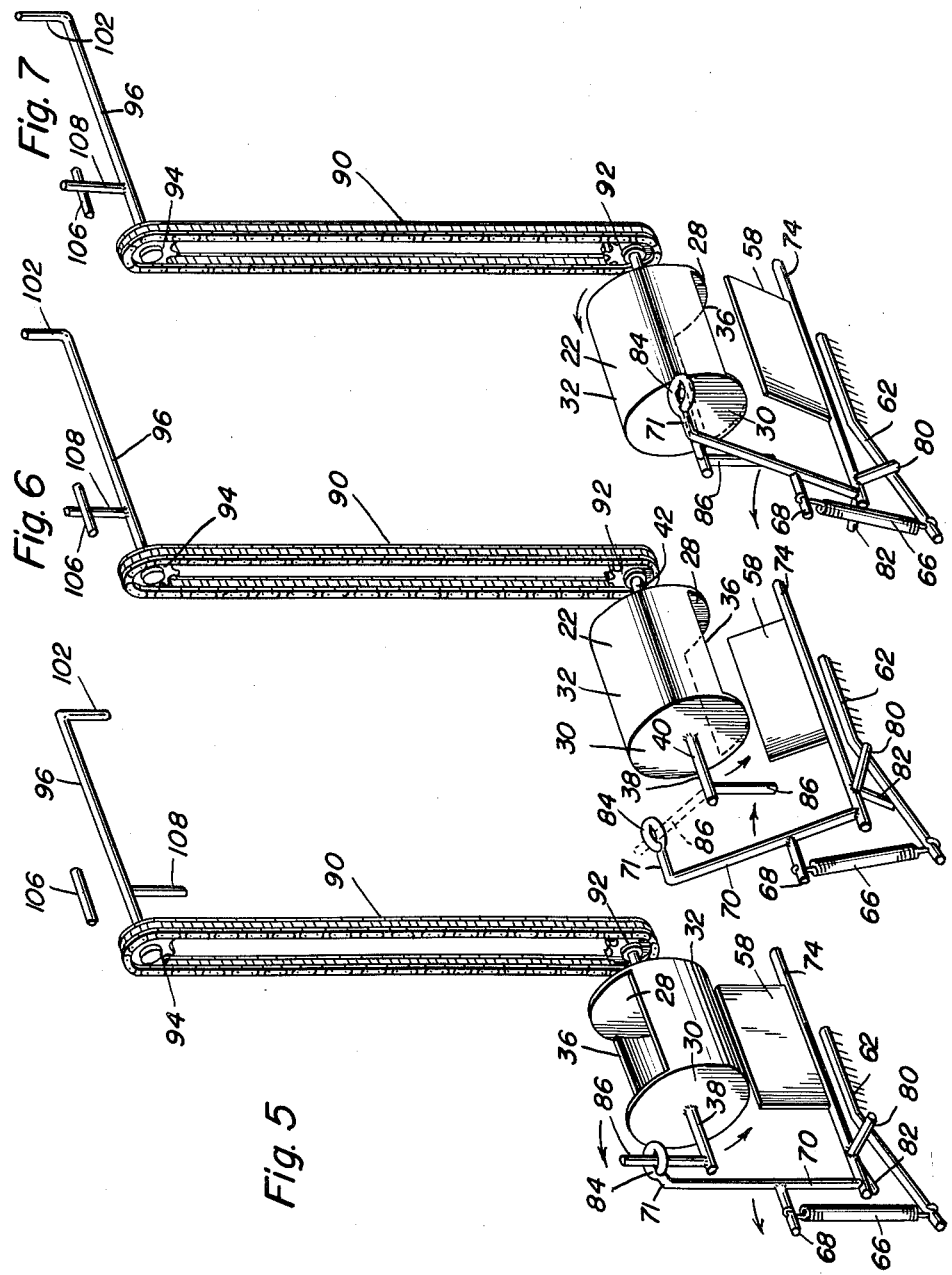
Joseph H. Rudd
INVENTOR.

United States Patent Office 3,034,688
Patented May 15, 1962

3,034,688
DAIRY BARN FEEDER
Joseph H. Rudd, Manteca, Calif.
(P.O. Box 537, Ripon, Calif.)
Filed Aug. 6, 1959, Ser. No. 832,104
10 Claims. (Cl. 222—330)

This invention relates to feeders and more particularly to feeders adapted to be used in dairy barns to alternately feed equal amounts in opposite directions.

An object of the invention is to provide a feeder which is very easily used and dependable and which discharges metered quantities of feed down a pair of chutes in order to alternately feed dairy animals in a barn. One chute is angled in one direction and the other is angled away from it so that the point of discharge of the feed is in the proper direction with reference to the normal positions of the dairy animals.

Briefly, the invention entails a feeder equipped with a hopper and a metering chamber having a drum therein. A unque mechanism for operating the drum in unison with a deflector makes it possible to discharge equal quantities of feed successively through the pair of chutes with absolutely no difficulty. The alacrity with which the dairy animals may be fed is evident inasmuch as it requires only a single manipulation of one handle to serve the purpose.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is an elevational view of the feeder.

FIGURE 2 is a side view of the feeder.

FIGURE 5 is a fragmentary perspective view showing the operating mechanism of the feeder.

FIGURE 6 is a perspective view showing the same mechanism but in a different position.

FIGURE 7 is a perspective view of the mechanism showing it in another position.

Figure 3:
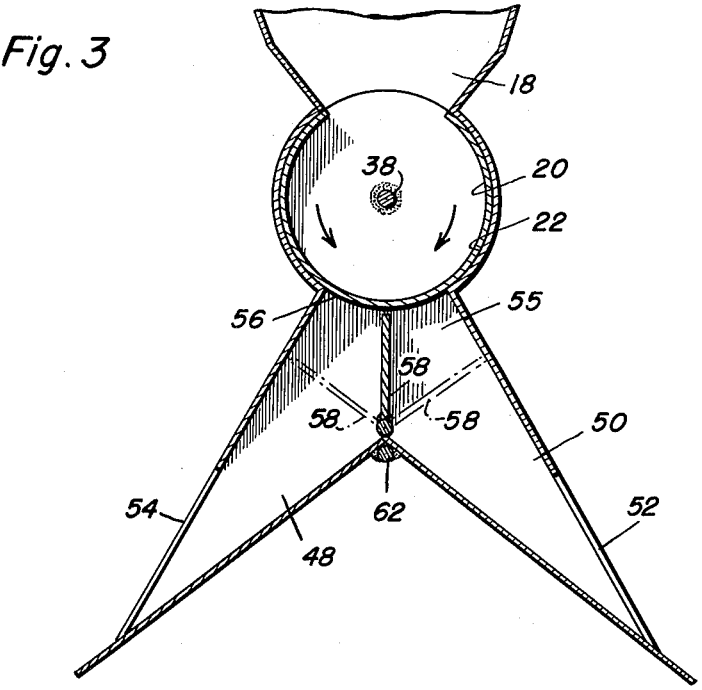
FIGURE 3 is a sectional view showing the lower portion of the feeder.

In the accompanying drawings there is illustrated a feeder 10 preferably made of lightweight material, for example sheet metal, and having a hopper 12 with an opening 14 in the top thereof covered by hinged door 16. The side walls of the hopper are sloped inwardly and downwardly to throat 18 (FIGURE 3) which is spaced vertically above the metering chamber 20 formed as a continuation of the lower walls of the hopper. The metering chamber is cylindrical and contains a metering drum 22 mounted for rotation in bearings formed by openings 24 and 26 in the front and rear walls of the metering chamber.

Figure 4:
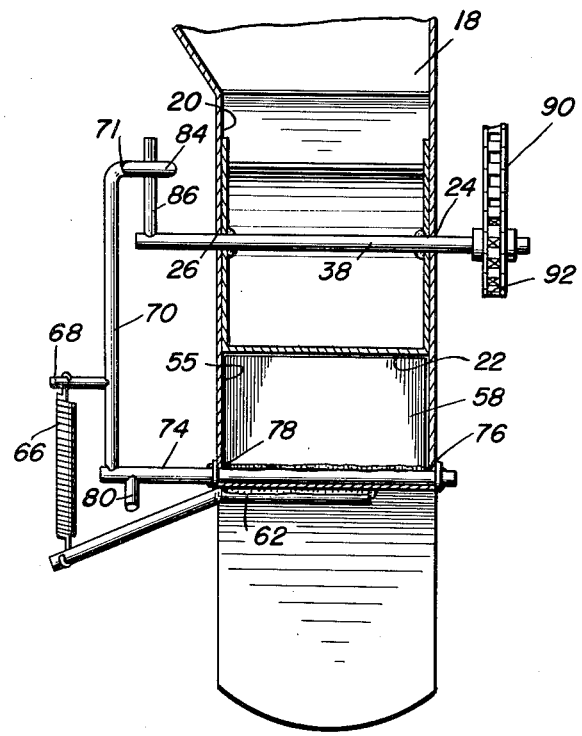
FIGURE 4 is a sectional view taken approximately on the line 4—4 of FIGURE 1.

Drum 22 has end walls 28 and 30 together with a cylindrical side wall 32 with a section thereof removed to form discharge opening 36. Shaft 38 is formed in two parts 40 and 42 and they are fixed to the end walls 30 and 28 respectively of the metering drum, or alternatively, the shaft may be in a single piece as shown in FIGURES 3 and 4 and extended through aligned apertures in the walls 28 and 30 and fixed in place, for instance by spot welding or the use of conventional couplings. In either case the shaft serves the usual purpose of a shaft, mounting metering drum 22 for rotation in metering chamber 20 between a material receiving position as shown in FIGURES 3 and 5 and a material discharging position as shown in FIGURES 6 and 7.

A pair of tapered chutes 48 and 50 are attached to the lower part of the metering chamber 20, and they have lower frontal discharge openings 52 and 54. The chutes merge to a common valve chamber 55 whose walls are fixed as a continuation of the lower ends of the side walls of chamber 20 and in alignment with an opening 56 at the bottom of chamber 20.

Valve chamber 55 contains a flow control valve or deflector 58 used to direct the feed issuing from the discharge opening of the metering drum down chute 48 or chute 50. The operation of the mechanical flow control means for actuating the flow blocking deflector 58 causes the deflector to occupy left and right flow blocking positions alternately as shown in dotted lines in FIGURE 3 and as shown in FIGURES 6 and 7 respectively. This mechanism consists of a fixed rod 62 attached at the juncture of the lower walls of chutes 48 and 50 and protruding outwardly and downwardly (FIGURE 4). A centering spring 66 is secured at one end to the rod 62 and secured at the other end to an arm 68 that protrudes laterally from rocker 70. Rocker 70 has lower shaft 74 fixed thereto and at right angles to the longitudinal axis of the rocker. Rocker shaft 74 is mounted in bearing openings 76 and 78 in the front and rear walls of the chamber 55 and is located directly above rod 62. Laterally extending stops 80 and 82 are secured to rocker shaft 74 and they are adapted to engage a part of rod 62 to establish a limit for the oscillatory motion of rocker 70 and rocker shaft 74 to define the flow blocking position of the deflector. Spring 66 exerts a force on the rocker promptly moving it in a direction to actuate the deflector 58 between the positions shown in FIGURES 6 and 7 when the deflector has been displaced from its center non-restricting position as illustrated in FIGURE 5 and by solid line in FIGURE 3.

There is an inwardly extending arm 71 at the top of the rocker and it has an eye 84 fixed thereto. Drive pin 86 is secured to one end of shaft 38 and is adapted to enter the eye 84 and propel the rocker 70 sufficiently to displace it from a center position whereupon spring 66 moves the rocker to cause a rapid valving function of deflector 58. The drive pin 86 then leaves the eye 84 as the drum 22 is rotated, whereby return movement of the drum enables the pin 86 to again enter eye 84 and propel the rocker 70 in the opposite direction, moving it to and through the over center position for spring 66 and enabling the spring to exert a toggle action force on the rocker to promptly move the deflector 58 to the other limit position of rest established by one of the stops 80 or 82 (depending on the direction of movement) to engage rod 62.

There are means for rotating the drum shaft 38 to cause this type of operation. Preferably, but not necessarily, the means consist of drive chain 90 which is entrained over sprockets 92 and 94. Sprocket 92 is at one end of shaft 38, and sprocket 94 is secured to the inner end of an operating shaft 96. The operating shaft 96 is mounted for rotation in bearings 98 carried by support bracket 100 that is fixed to a wall of the hopper. A handle 102 is on the outer end of shaft 96 to facilitate turning the shaft, and there is a stop 106 secured to bracket 100 and engaged by another stop 108 on the shaft 96. This prevents the shaft 96 from being rotated a full 360 degrees, but allows the shaft to be rotated a distance sufficient to cause the previously described operation of the deflector adjusting mechanism and also the drum 22 which is fixed to shaft 38. This drum, as is seen by a comparison of FIGURES 5–7, is rotated in timed sequence with the actuation of the deflector operating mechanism so that the opening in the drum is registered with the throat of hopper 38 when the deflector 58 is in an upright center or neutral position as shown in FIGURE 5. However, when the shaft 38 is rotated sufficiently to empty the metering drum, the deflector 58 is in either the left or right positions so that the feed is discharged entirely down one of the chutes 48 or 50. Successive actuation cycles of the drum will cause successive chutes 48 and 50 to receive feed, this being governed by the alternately positionable deflector 58 requiring feed discharge from one chute and then the other in response to successive cycles of operation of the drum as caused by rotation of shaft 96.

It is intended that the hopper and the balance of the mechanism associated with the hopper be conveniently mounted for feeding in a barn. Therefore mounting brackets 130 and 132 are secured to the sides of the hopper and these have clamps 134 thereon to be attached to a post 136 or the like.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A feed distributor comprising, a hopper, a metering drum fed by said hopper and having a discharge opening, means for rotating said metering drum successively in the clockwise and counterclockwise directions, a centering mechanism having an operative connection to said drum, a deflector actuated by and drivingly connected with said centering mechanism, and discharge chutes in communication with said drum discharge opening and selectively controlled by said deflector to receive successive charges of feed from said drum as deflected by said deflector in response to rotation of the drum in a selected direction.

2. The combination of claim 1 wherein, said centering mechanism includes a spring, means to fixedly anchor one end of said spring for pivotal displacement of the spring with respect thereto, a rocker to which said deflector is connected, the opposite end of said spring being attached to said rocker for pivotal displacement with the rocker by the drum.

3. The combination of claim 2 including, an eye on said rocker, a shaft mounting said drum for rotation, and a drive pin connected to the drum shaft and adapted to enter said eye and initially propel said rocker to effect pivotal displacement of said spring to exert a toggle action.

4. The combination of claim 3, including stops connected to said rocker and engageable with the anchor means to limit pivotal displacement of said rocker in both clockwise and counterclockwise directions.

5. In a feeder for successively discharging equal quantities of feed from a hopper through discharge chutes, a metering device selectively movable in opposite directions, a chamber in communication with said chutes, a deflector mounted for adjustable movement in said chamber and adapted to alternately open and close said chutes, a rocker shaft to which said deflector is secured, a rocker secured to said rocker shaft, and drive means operatively connecting said device with said rocker and under selective control of the device to selectively move said rocker in opposite directions and thereby selectively move said deflector in opposite directions.

6. The combination of claim 5 wherein, the drive means includes an eye attached to said rocker, a shaft connected with said device, a drive pin on said shaft of a dimension to enter and leave said eye in response to rotation of said device.

7. The combination of claim 6, wherein there is a spring operatively connected to said rocker to move said rocker and deflector with a snap action between the full open and full closed positions with reference to a selected chute.

8. A feed distributor comprising, inlet hopper means, a plurality of discharge passage means, metering means movably mounted between said hopper means and said plurality of discharge passage means for directionally selected movement between a material receiving position and a material discharging position, flow blocking means movably mounted between said plurality of discharge passage means for blocking flow of material to one of said discharge passage means in response to movement of the metering means to a material discharging position, drive means operatively connecting the metering means to the flow blocking means for effecting blockage of selected discharge passage means of said plurality of discharge passage means in accordance with said directionally selected movement of the metering means, said flow blocking means including deflector means displaceable from a non-restricting position in response to movement of the metering means toward said material discharging position, and limit means engageable with the deflector means to define passage blocking positions for said deflector means, said drive means comprising disengageable means drivingly connected to the metering means and flow blocking means for imparting movement to the flow blocking means in response to directionally selected movement of the metering means from said material receiving position and biasing means operatively connected to the flow blocking means and disengageable means for returning the flow blocking means to the non-restricting position in response to disengagement of the disengageable means as the metering means approaches the material discharging position.

9. A feed distributor comprising, inlet hopper means, a plurality of discharge passage means, metering means movably mounted between said hopper means and said plurality of discharge passage means for directionally selected movement between a material receiving position and a material discharging position, flow blocking means movably mounted between said plurality of discharge passage means for blocking flow of material to one of said discharge passage means in response to movement of the metering means to a material discharging position, and drive means operatively connecting the metering means to the flow blocking means for effecting blockage of selected discharge passage means of said plurality of discharge passage means in accordance with said directionally selected movement of the metering means, said drive means comprising disengageable means drivingly connected to the metering means and flow blocking means for imparting movement to the flow blocking means in response to directionally selected movement of the metering means from said material receiving position and biasing means operatively connected to the flow blocking means and disengageable means for returning the flow blocking means to a non-restricting position in response to disengagement of the disengageable means as the metering means approaches the material discharging position.

10. A feed distributor comprising, a hopper, a metering chamber formed below the hopper for receiving grain therefrom, a metering drum rotatably mounted about a rotational axis in the metering chamber and selectively rotated in either direction between a material receiving position and a material discharging position, a pair of discharge chutes having inlet ends connected to the metering chamber separated by a pivotally mounted deflector when in a center position, a rocker connected to the deflector pivotally displaceable about a fixed axis spaced below the rotational axis of the metering drum, a centering spring connected at one end to said rocker and at the other end to a fixed anchor spaced from the fixed axis in alignment with said rotational axis of the metering drum, a drive pin connected to the metering drum for movement therewith and means mounted on the rocker for engagement with the drive pin and disengageable therefrom as the metering drum approaches the material discharging position.

References Cited in the file of this patent

UNITED STATES PATENTS

| | | |
|---|---|---|
| 623,775 | Fey | Apr. 25, 1899 |
| 2,097,368 | Frank | Oct. 26, 1937 |
| 2,706,581 | Albers | Apr. 19, 1955 |